(12) United States Patent
Liu et al.

(10) Patent No.: US 10,716,324 B2
(45) Date of Patent: Jul. 21, 2020

(54) IMMOBILIZED FLAVORANTS FOR FLAVOR DELIVERY

(71) Applicant: Philip Morris USA Inc., Richmond, VA (US)

(72) Inventors: Shengsheng Liu, Henrico, VA (US); Munmaya K. Mishra, Manakin Sabot, VA (US); Peter J. Lipowicz, Midlothian, VA (US); Biao Duan, Henrico, VA (US)

(73) Assignee: Philip Morris USA Inc., Richmond, VA (US)

( * ) Notice: Subject to any disclaimer, the term of this patent is extended or adjusted under 35 U.S.C. 154(b) by 598 days.

(21) Appl. No.: 14/942,636

(22) Filed: Nov. 16, 2015

(65) Prior Publication Data

US 2016/0135494 A1    May 19, 2016

Related U.S. Application Data

(63) Continuation of application No. 12/577,029, filed on Oct. 9, 2009, now Pat. No. 9,185,925.

(51) Int. Cl.
| | | |
|---|---|---|
| A24B 13/00 | (2006.01) | |
| A24B 15/28 | (2006.01) | |
| C08F 8/14 | (2006.01) | |
| C08F 20/18 | (2006.01) | |
| C08F 220/18 | (2006.01) | |
| A23L 27/20 | (2016.01) | |
| A24B 15/30 | (2006.01) | |
| A24F 47/00 | (2020.01) | |

(52) U.S. Cl.
CPC ............ *A24B 13/00* (2013.01); *A23L 27/201* (2016.08); *A24B 15/284* (2013.01); *A24B 15/30* (2013.01); *A24F 47/008* (2013.01); *C08F 8/14* (2013.01); *C08F 20/18* (2013.01); *C08F 220/18* (2013.01)

(58) Field of Classification Search
CPC .............................. A24B 13/00; C08F 220/18
USPC ................................................ 131/207, 202
See application file for complete search history.

(56) References Cited

U.S. PATENT DOCUMENTS

| | | |
|---|---|---|
| 3,111,127 A | 11/1963 | Jarboe |
| 3,126,012 A | 3/1964 | Jarboe et al. |
| 3,128,772 A | 4/1964 | Jarboe et al. |
| 3,312,226 A | 4/1967 | Bayley et al. |
| 3,332,428 A | 7/1967 | Mold et al. |
| 3,499,452 A | 3/1970 | Kallianos et al. |
| 3,550,598 A | 12/1970 | McGlumphy et al. |
| 4,029,759 A | 6/1977 | Humbert et al. |
| 4,092,988 A | 6/1978 | Van Auken et al. |
| 4,109,663 A | 8/1978 | Maeda et al. |
| 4,119,106 A | 10/1978 | Grubbs et al. |
| 4,157,384 A | 6/1979 | Watson et al. |
| 4,206,301 A | 6/1980 | Yolles |
| 4,212,310 A | 7/1980 | Van Auken et al. |
| 4,509,537 A | 4/1985 | Houminer et al. |
| 4,532,944 A | 8/1985 | Podraza |
| 4,540,004 A | 9/1985 | Podraza et al. |
| 4,569,852 A | 2/1986 | Yang |
| 4,966,171 A | 10/1990 | Serrano et al. |
| 5,009,893 A | 4/1991 | Cherukuri et al. |
| 5,137,578 A | 8/1992 | Chan |
| 5,139,034 A | 8/1992 | Chan |
| 5,240,016 A | 8/1993 | Nichols et al. |
| 5,388,594 A | 2/1995 | Counts et al. |
| 5,451,404 A | 9/1995 | Furman |
| 5,499,636 A | 3/1996 | Baggett, Jr. et al. |
| 5,666,976 A | 9/1997 | Adams et al. |
| 5,692,525 A | 12/1997 | Counts et al. |
| 5,692,526 A | 12/1997 | Adams et al. |
| 5,915,387 A | 6/1999 | Baggett, Jr. et al. |
| 5,988,176 A | 11/1999 | Baggett, Jr. et al. |
| 6,026,820 A | 2/2000 | Baggett, Jr. et al. |
| 6,315,987 B1 | 11/2001 | Plochocka |
| 6,464,961 B2 | 10/2002 | Plochocka |
| 6,589,050 B1 | 7/2003 | Mackey et al. |
| 6,887,493 B2 | 5/2005 | Shefer et al. |
| 7,048,912 B2 | 5/2006 | Plochocka |
| 7,959,990 B2 | 6/2011 | Cherkaoui et al. |
| 2002/0187108 A1 | 12/2002 | Rajaiah et al. |
| 2004/0253188 A1* | 12/2004 | Plochocka ........... A61K 8/0208 424/49 |
| 2005/0000531 A1 | 1/2005 | Shi |
| 2006/0104188 A1 | 5/2006 | Yamashita et al. |
| 2006/0144410 A1* | 7/2006 | Luan ..................... A24D 3/163 131/207 |
| 2007/0100076 A1 | 5/2007 | Hayes et al. |
| 2007/0154718 A1 | 7/2007 | Silverman et al. |
| 2010/0069557 A1 | 3/2010 | Moad et al. |
| 2010/0092792 A1 | 4/2010 | Inari et al. |

OTHER PUBLICATIONS

Liu, Shengsheng et al., "Atom Transfer Radical Polymerization of Menthyl Acrylate", Macromolecules, vol. 40, No. 4, Jan. 30, 2007, pp. 867-871 (American Chemical Society).
Partial International Search Report dated Dec. 30, 2010 for PCT/EP2010/006196.
International Search Report and Written Opinion dated Apr. 21, 2011 for PCT/EP2010/006196.
Shengheng Liu, Atom Transfer Radical Polymerization of Menthyl Acrylate, 2007, Macromolecules, 40, 867-871.
International Preliminary Report on Patentability dated Apr. 11, 2012 for PCT/EP2010/006196.

* cited by examiner

*Primary Examiner* — Monique R Peets
(74) *Attorney, Agent, or Firm* — Harness, Dickey & Pierce, P.L.C.

(57) ABSTRACT

Disclosed is a copolymer that includes a repeat unit containing a flavorant-containing pendant and a salt-containing repeating unit. In addition, a comestible, a smoking composition, a smoking article, a smokeless tobacco composition and a heatable or combustible product are provided which incorporate one or more of the flavorant-containing copolymer.

13 Claims, 2 Drawing Sheets

GC/MS Pyrolysis of Menthol Functionalized Poly(methyl acrylate) at 300 °C

TGA/MS of Menthol Functionalized Poly(methyl acrylate)

IMMOBILIZED FLAVORANTS FOR FLAVOR DELIVERY

This application is a continuation application of U.S. application Ser. No. 12/577,029 entitled Immobilized Flavorants For Flavor Delivery, filed on Oct. 9, 2009, the entire content of which is incorporated herein by reference.

SUMMARY

In one embodiment is provided a copolymer comprising a flavorant-containing repeating unit and a salt-containing repeating unit.

In another embodiment is provided a comestible containing a copolymer described herein.

In another embodiment is provided a method for preparing a copolymer comprising a flavorant-containing repeating unit and a salt-containing repeating unit by polymerizing a flavorant-containing monomer and a salt-containing monomer.

In another embodiment is provided a method for preparing a copolymer comprising a flavorant-containing repeating unit and a salt-containing repeating unit, comprising (a) polymerizing a flavorant-containing monomer and a monomer having a group capable of being converted into a salt form; and (b) converting the group capable of being converted into a salt form into a salt form.

In another embodiment is provided a method for preparing a copolymer comprising a flavorant-containing repeating unit, wherein the flavorant is linked to a polymeric backbone through a non-carbonate linking group comprising functionalizing a polymer with a flavorant compound by forming said non-carbonate linking group.

In another embodiment is provided a method for delivering flavorant comprising subjecting a copolymer comprising a flavorant-containing repeating unit and a salt-containing repeating unit, wherein the flavorant is linked to a polymeric backbone through a non-carbonate linking group, and capable of releasing said flavorant, to pyrolysis, hydrolysis, mastication or swelling to release the flavorant from the copolymer.

In another embodiment is provided a smoking composition comprising: (a) a smokable material; and (b) a copolymer comprising a flavorant-containing repeating unit and a salt-containing repeating unit, wherein the flavorant is linked to a polymeric backbone through a non-carbonate linking group, and capable of releasing said flavorant.

In another embodiment is provided a smoking article comprising: (a) a rod of tobacco or tobacco substitute; (b) optionally a filter attached to the rod; and (c) a copolymer comprising a flavorant-containing repeating unit and a salt-containing repeating unit, wherein the flavorant is linked to a polymeric backbone through a non-carbonate linking group, which is capable of releasing the flavorant.

In another embodiment is provided a smokeless tobacco composition comprising: (a) tobacco or tobacco substitute; and (b) a copolymer comprising a flavorant-containing repeating unit and a salt-containing repeating unit, wherein the flavorant is linked to a polymeric backbone through a non-carbonate linking group, which is capable of releasing the flavorant.

A heatable or combustible product comprising a copolymer comprising a flavorant-containing repeating unit and a salt-containing repeating unit, or a polymer comprising a flavorant-containing repeating unit, wherein the flavorant is linked to a polymeric backbone through a non-carbonate linking group, which is capable of releasing the flavorant.

By covalently binding the flavorant to the polymeric backbone, migration and losses of the flavorant prior to use can be prevented, and release of the flavorant under predetermined conditions can be obtained. In a particular embodiment, the copolymer can be incorporated in a comestible, a smoking composition, a smoking article, a smokeless tobacco composition and a heatable or combustible product, which can release the flavorant when used.

DETAILED DESCRIPTION OF PREFERRED EMBODIMENTS

Figure 1:
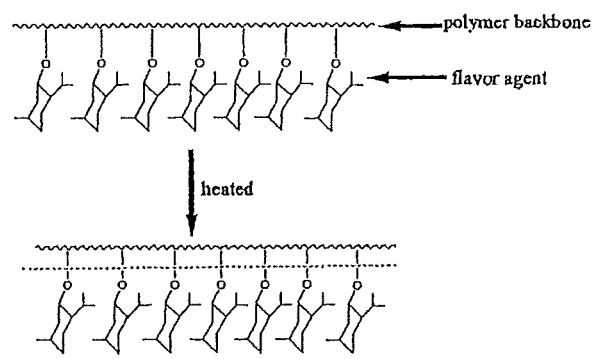
FIG. 1 is a schematic illustration of menthol release from a menthol-containing polymer upon heating.

As used herein, the term "copolymer" is intended to include polymers having two or more types of repeating units.

As used herein, the term "flavorant-containing repeating unit" is intended to include a repeating unit of a copolymer having a flavorant covalently bonded thereto.

As used herein, the term "salt-containing repeating unit" is intended to include a repeating unit of a copolymer having a group containing an ionic salt bonded thereto.

In the copolymer described herein, the flavorant compound can be covalently bonded to the body of the polymer (i.e., polymeric backbone), as a pendant, and therefore cannot freely migrate. This helps to reduce potential migration and losses of the flavorant compound, e.g., during handling and storage. As a result, a flavorant-containing polymer may be applied to or incorporated in an end product in the precise quantity and location desired. The flavorant compound may be controllably released from the polymer by subjecting the polymer to predetermined conditions, including pyrolysis, as well as non-pyrolytic treatment such as hydrolysis, mastication and swelling, etc. Pyrolysis causes chemical changes in the molecule and can be achieved by exposure to an elevated temperature, e.g., upon heating, combusting or both.

The flavorant-containing copolymers described herein may contain any polymeric backbone, i.e., the polymeric chain containing repeating units. Preferably, the copolymers do not form compounds with unpleasant and/or undesirable tastes and/or odors when releasing the flavorants. Examples of suitable copolymers may include, but are not limited to, condensation polymers, such as polyesters, polyamides and polyurethanes, and addition polymers such as polyethylenes, polypropylenes, poly(meth)acrylates and polyacrylonitriles. As used herein, the term "(meth)acrylates" is intended to include acrylates and methacrylates. Preferably, the flavorant-containing polymers comprise poly(meth)acrylates or poly(itaconate).

Any flavorant compound may be used in the flavorant-containing copolymers described herein, provided that it can be attached to a polymeric backbone. Preferably, the flavorant can be released under predetermined conditions without decomposition. In an embodiment, the flavorant compound can have at least one hydroxyl, carboxyl, aldehyde and/or ketone group in the molecule. Examples of suitable flavorants may include, but are not limited to, menthol, vanillin, linalool, guaicol, thymol, coumarin, eugenol, cinnamaldehyde, geraniol and carvone.

A flavorant compound can be bound to the polymeric backbone by a linking group. In an embodiment, the linking group is not a carbonate linking group. One or more flavorant compounds may be bound to the same or different polymeric backbone.

For example, when a flavorant compound containing hydroxyl group(s) is employed, a carboxylate linking group can be useful. In this embodiment, the hydroxyl group(s) in the flavorant compound can be reacted with the carboxylate group, forming an ester. Further, under appropriate conditions, the flavorant compound containing hydroxyl group(s) can be, for example, hydrolyzed or pyrolyzed, to release the flavorant compound containing hydroxyl group(s) in its original form.

In another embodiment, dicarboxylates, such as oxalate, gluarate, and succinate may be used to connect a flavorant compound containing hydroxyl group(s) to the polymeric backbone through a diester linkage. In yet another embodiment, a tri- or oligo-carboxylate compound can be used to connect one, two or more molecules of flavorant compounds containing hydroxyl group(s) to the polymeric backbone. In these embodiments, the same or different flavorant compounds containing hydroxyl group(s) may be bound to the polymeric backbone through a single linking group. A specific example of this embodiment would be the use of a tricarboxylate such as $CH(CO_2-)_3$ as the linking group, which would form a triester linkage between two flavorant compounds (F' and F" which are the same or different) and the polymeric backbone (R) as shown below:

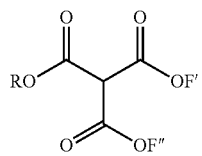

In an alternative manner, a flavorant compound containing hydroxyl group(s) may be bound to a polymeric backbone through an ether linking group. Moreover, methoxy—(—O-Me-O—) and ethoxy—(—O-Et-O—) linking groups can also be used, forming diethers with the flavorant compound containing hydroxyl group(s). Furthermore, a tri- or other oligo-ether, such as R—O-Me-O-Me-O—F, R—O-Et-O-Me-O—F, and R—$(OMe)_n$-O—F (where R— is the polymer backbone and F is the flavorant compound containing hydroxyl group(s)) can be utilized to link the flavorant compound to the polymeric backbone.

When an aldehydic or ketonic flavorant compound is employed, it can be bound to a polymeric backbone as a hemiacetal/hemiketal or as an acetal/ketal. By hydrolyzing the acetal/ketal or hemiacetal/hemiketal, for example, the aldehydic or ketonic flavorant compound can be released.

Many other appropriate types of linkages are also available. Some factors to consider for evaluating an appropriate linkage may include the nature of flavorant compound, ease and controllability of release of the flavorant compound from the linking group, etc.

In an embodiment, the flavorant-containing copolymers described herein may further include a repeating unit containing a salt. Examples of suitable salts may include, but are not limited to, salts of carboxylic acid. The salts of carboxylic acid can preferably be metal salts, and more preferably, alkali and alkaline earth metal salts such as sodium, potassium, magnesium and calcium.

The flavorant-containing polymers can be prepared by one of several methods. In an embodiment, an existing polymer can be modified or functionalized with one or more flavorant compounds by chemically bonding the flavorant compounds to the polymeric backbone through one or more linking groups described herein. Examples of modification or functionalization may include, but are not limited to, esterification, etherification, (hemi)acetalization, (hemi)ketalization, cross-coupling, transesterification and transetherification.

In another embodiment, flavorant-containing monomers can be homopolymerized or copolymerized with other monomers to form a flavorant-containing polymer. In these embodiments, the flavorant-containing monomers may be monomers containing one type of flavorant. Alternatively, monomers containing two or more different types of flavorants with same or different concentrations can be utilized to prepare a copolymer containing multiple types of flavorants.

Similarly, a salt pendant in a flavorant-containing polymer can be formed. In an embodiment, a monomer containing a salt can be polymerized. In another embodiment, a polymer can be treated to form a salt pendant. For example, when poly(menthyl acrylate-co-acrylic acid) is treated with sodium hydroxide, a carboxylic acid pendant in the polymer can be converted into a sodium salt pendant as shown below:

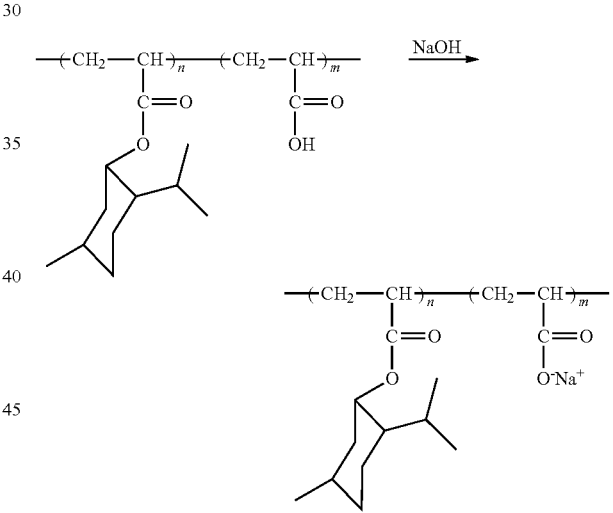

Polymerization may be effected by any of a variety of means well known in the art. For example, free radical polymerization may be used. Additionally, atom transfer radical polymerization may be used. Anionic and cationic addition polymerization may be used as well. Coordination polymerization can be used for appropriate monomers, as well as step growth or condensation polymerization. Further, polymerization may be performed in an appropriate solvent or in the absence of solvents. The specific polymerization methods used will vary depending on the nature of the monomers used.

The flavorant-containing polymers described herein may optionally be further processed, e.g., by extrusion, to form various sizes and shapes such as micro beads, sticks, tubes, films, fibers, powders, and other forms. Preferably, such processing can be carried out at a temperature such that pyrolysis or other decomposition of the polymers do not occur. This can allow the flavorant-containing polymers to be conveniently physically placed or inserted in any desired location of an end product.

Generally, the flavorant-containing polymers can have a number average molecular weight ($M_n$) of about 2,000 to about 10,000,000 daltons. Preferably, the polymers can have an $M_n$ of about 2,000 to about 100,000 daltons so as to maintain solubility in a variety of solvents. More preferably, the polymers have an $M_n$ of about 2,000 to about 20,000 daltons and most preferably, about 2,000 to about 5,000 daltons.

There are a variety of ways in which the flavorant compounds may be released from the copolymeric forms described herein and delivered into/by the associated products. Release of the flavorant compounds from the flavorant-containing copolymers may occur by any of a variety of methods, including pyrolysis, hydrolysis, mastication and swelling. The method of release may vary depending on the nature of the end product in which the flavorant-containing copolymer is used. For example, if the flavorant-containing copolymer is a heatable or combustible article, flavorant release may be accomplished by pyrolysis. Further, for use of the flavorant-containing polymer in, for example, a comestible or smokeless tobacco product, release may be effected by mastication, hydrolysis or swelling. FIG. 1 illustrates menthol release from a menthol-containing polymer upon heating.

When the flavorant-containing polymers are subjected to pyrolysis, in some cases, the flavorant-containing copolymers having a salt pendant can release flavorants more cleanly and efficiently than the corresponding flavorant-containing polymers without a salt pendant. For example, poly(menthyl acrylate-co-sodium acrylate) releases menthol by pyrolysis more cleanly and efficiently than poly(menthyl acrylate). Similar results can also be obtained with metal salts other than sodium. Moreover, this effect can be observed in (menthyl methacrylate) polymers. In contrast, a physical mixture of a menthyl (meth)acrylate homopolymer and poly(sodium acrylate) does not lead to the same effect upon pyrolysis. Although not wishing to be bound by any theory, it is believed that the salt moiety interacts with the menthol moiety intra-molecularly, thereby facilitating menthol release under pyrolysis. Therefore, by manipulating the salt and flavorant moieties within a polymer, it appears to be possible to activate flavorant release at different temperatures and/or further to improve flavorant release efficiency.

The flavorant-containing copolymers can be incorporated into a variety of products. In an embodiment, a flavorant-containing copolymer can be used in a comestible, preferably in an amount of about 0.0001-10% by weight based on the amount of the comestible. The flavorant-containing copolymer may be added at any point in the process of making the comestible to be treated. Preferably, after the addition of the flavorant-containing copolymer, the mixture is not subsequently subject to conditions, such as high temperatures and wet conditions, that might cause release of the flavorant during manufacture. Release of the flavorant can be accomplished by mastication, hydrolysis, swelling or a mixture of non-pyrolytic release mechanisms. In another embodiment, release of the flavorant can be accomplished by heating, such as release of mint or other flavor in a hot chocolate, cocoa, coffee or tea drink. In these embodiments, it would be possible to make, for example, a mint-flavored chocolate which does not flavor other mint-less chocolates with which it is packaged.

In another embodiment, a smoking composition is provided which comprises a smokable material and the flavorant-containing copolymer described herein. Preferably, the flavorant-containing copolymer can be incorporated in an amount of about 0.001 to 10 weight percent, based on the weight of the smokable material.

The smokable material may include either tobacco (i.e., cut filler, tobacco powder, etc.) or tobacco substitute materials (i.e., vegetable or plant products like shredded lettuce), or mixtures or combinations thereof. Examples of suitable types of tobacco materials may include, but are not limited to, flue-cured tobacco, Burley tobacco, Maryland tobacco, Oriental tobacco, rare tobacco, specialty tobacco, reconstituted tobacco, agglomerated tobacco fines, blends thereof and the like. Preferably, the tobacco or tobacco substitute is pasteurized. Some or all of the tobacco material may be fermented.

Further, the tobacco or tobacco substitute may be provided in any suitable form, including shreds and/or particles of tobacco lamina, processed tobacco materials, such as volume expanded or puffed tobacco, or ground tobacco, processed tobacco stems, such as cut-rolled or cut-puffed stems, reconstituted tobacco materials, blends thereof, and the like. Genetically modified tobacco may also be used.

The flavorant-containing copolymer may be incorporated into a smoking composition in a variety of ways. For example, the flavorant-containing copolymer may be processed into a solid and added to the smokable material. Alternatively, the flavorant-containing copolymer may be dissolved or suspended in an appropriate solvent, such as water and alcohol, and applied to the smokable material, for example, by spraying, dipping or dropping. Further, the flavorant-containing copolymer may be added as a powder to the smokable material. Release of the flavorant can be accomplished by pyrolysis when the smoking composition is burned or heated and preferably at about 150 to 500° C.

In yet another embodiment, smoking articles are provided which comprise (a) a rod of tobacco or tobacco substitute, (b) optionally a filter attached to the rod; and (c) the flavorant-containing copolymer described herein.

Smoking articles, such as cigarettes, generally have a substantially cylindrical rod shaped structure which typically includes a roll or column of smokable material, such as shredded tobacco, surrounded by a paper wrapper. Many types of cigarettes may have a cylindrical filter portion aligned in an end-to-end relationship with the tobacco rod. The filter portion can comprise one or more plugs formed from a cellulose acetate tow circumscribed by a paper material known as "plug wrap" thereby forming a "filter plug." Typically, the filter portion is attached to one end of the tobacco rod using a circumscribing wrapping material known as "tipping paper."

As used herein, the term "smoking article" is intended to include cigarettes, cigars, pipes and the like. In particular, the smoking article can be a traditional or non-traditional lit-end cigarette comprising a tobacco rod and a filter attached thereto. Non-traditional cigarettes include, but are not limited to, cigarettes for electrical smoking systems as described in commonly-assigned U.S. Pat. Nos. 6,026,820; 5,988,176; 5,915,387; 5,692,526; 5,692,525; 5,666,976; and 5,499,636. Other non-traditional cigarettes include those having a fuel element in the tobacco rod as described in U.S. Pat. No. 4,966,171.

The flavorant-containing copolymer can be incorporated in one or more portions of a smoking article. For example, the flavorant-containing copolymer can be admixed with tobacco or tobacco substitute to form a rod of a smoking article. Alternatively, the flavorant-containing copolymer can be formed into a unitary solid and mechanically inserted into the rod. Further, the flavorant-containing copolymer may be incorporated into the wrapper for the rod when the smoking article is a cigarette. The flavorant-containing copolymer can also be incorporated in the filter (if used) or plug wrap therefor in a smoking article. Moreover, the flavorant-containing copolymer may be incorporated in a cavity between the rod and the filter of a smoking article.

Preferably, the flavorant-containing copolymer can be incorporated in the rod or wrapper therefor, and toward the downstream end of the rod in a smoking article. In this embodiment, release of the flavorant can be enhanced toward the last puffs and hence, provide consumers with refreshing aroma finish.

In one embodiment, a smokeless composition is provided which comprises a mixture of tobacco or tobacco substitute and the flavorant-containing copolymer described herein.

The flavorant-containing copolymer may be incorporated into a smokeless composition in a variety of ways. For example, the flavorant-containing copolymer can be dissolved in an appropriate solvent and sprayed upon a tobacco or tobacco substitute. The flavorant-containing copolymer may also be suspended in a liquid such as water or alcohol and applied to a tobacco or tobacco substitute, for example, for spraying, dipping or dropping. Further, the flavorant-containing copolymer may be added as a powder or processed unit to a tobacco or tobacco substitute. Release of the flavorant can be accomplished by mastication, hydrolysis, swelling or a combination of non-pyrolytic release mechanisms. In this embodiment, it would be possible using these flavorant-containing polymers to produce, for example, a container enclosing multiple flavors of snuff, where each flavor is unaffected by the other flavors in the container.

In another embodiment, the flavorant-containing copolymer may be incorporated into heatable or combustible products. In this embodiment, pleasant fragrances can be released into the local atmosphere when the products are heated or burned. For example, by incorporating about 0.0001 to 10% by weight of the flavorant-containing copolymer into an otherwise unscented candle, a candle can be produced which has little or no discernable fragrance before lighting, but releases a fragrance upon combustion. A flavorant-containing copolymer may also be incorporated into other products including fragrance sticks, incense, room deodorizers, artificial or treated fireplace logs and other products which are heated or combusted in a domestic or other environment for aesthetic reasons.

The following examples are provided to further describe various embodiments of the present invention. However, the present invention is not limited hereto.

EXAMPLES

Example 1

Transesterification Procedure for Preparing Poly(Menthyl Methacrylate)

In a typical procedure, a solution of poly(methyl methacrylate) in toluene can be charged to a round bottom flask equipped with a rubber septum and a magnetic stirring bar. A required amount of sodium mentholate solution in heptane can be added to the flask and the mixture can be allowed to stir at ambient temperature for 24 hours. The reaction mixture can then be washed with water several times and dried over anhydrous sodium sulfate. The solvent can be removed by rotary evaporation to prepare a dry polymer. The product can be characterized by proton NMR which would show the characteristic resonances for menthol along the polymeric backbone. Gas chromatography (GC)/mass spectrometry (MS) and thermogravimetric analysis (TGA)/MS can be used to show the release of menthol upon heating the obtained polymer.

Example 2

Bulk Polymerization Procedure for Preparing Poly(Menthyl Acrylate-Co-Acrylic Acid)

In a typical synthesis, required amounts of menthyl acrylate, acrylic acid and 2,2'-azobisisobutyronitrile (AIBN) are charged to a round bottom Schlenk flask equipped with a magnetic stir bar. After two "freeze-pump-thaw" cycles (to remove oxygen), the flask is filled with nitrogen and then put into an oil bath at a preset temperature. The reaction is terminated after a designated time. The crude product is dissolved in acetone, and then precipitated in hexane. The composition of the copolymer is determined by proton NMR. The results are summarized in following Table 1:

TABLE 1

Bulk polymerization of menthyl acrylate (MnA) and acrylic acid (AA) by free radical polymerization (solvent free polymerization)

| Run | MnA (g) | AA (g) | AIBN (g) | Temp. (° C.) | Time (h) | Conversion (%) | Mn | Mw/Mn | MnA in copolymer (mol %) |
|---|---|---|---|---|---|---|---|---|---|
| 1 | 2.20 | 0.43 | 0.20 | 90 | 0.5 | 72 | 4700 | 4.2 | 62.1 |
| 2 | 2.20 | 0.86 | 0.20 | 90 | 1 | 79 | 2500 | 1.7 | 49.8 |
| 3 | 3.17 | 1.71 | 0.13 | 85 | 3.5 | 88 | 3000 | 1.3 | 40.0 |
| 4 | 4.52 | 3.61 | 0.16 | 85 | 2.5 | 68 | n.d. | n.d. | 26.2 |
| 5 | 2.08 | 2.84 | 0.10 | 85 | 2.5 | 67 | n.d. | n.d. | n.d. |
| 6 | 34.3 | 13.4 | 3.13 | 75 | 1.0 | 61 | 2300 | 1.7 | 49.9 |

AIBN = 2,2'-Azobisisobutyronitrile;
Mn = number average molecular weight;
Mw = weight average molecular weight;
n.d. = not determined

Example 3

Flavor Functionalization of a Polymer and Flavor Release from the Polymer

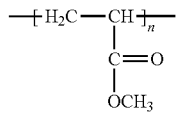

Poly(methyl acrylate): Mw = 40,000 g/mole by GPC

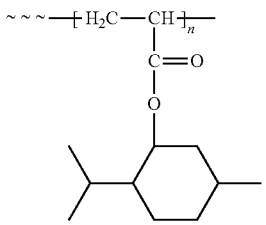

Menthol functionalized poly(methyl acrylate)

Figure 2:
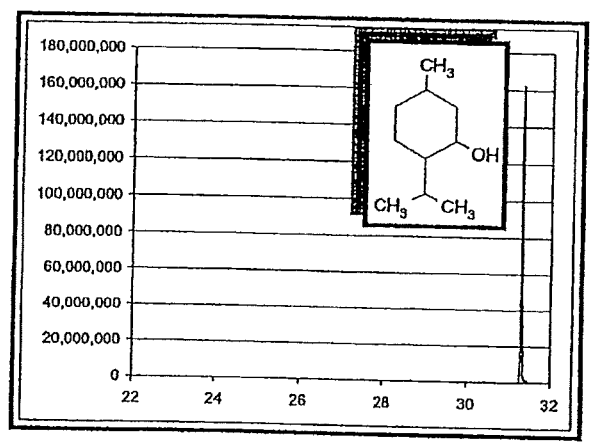
FIG. 2 is a GC/MS pyrolysis graph of poly(menthyl acrylate) at 300° C.
Figure 3:
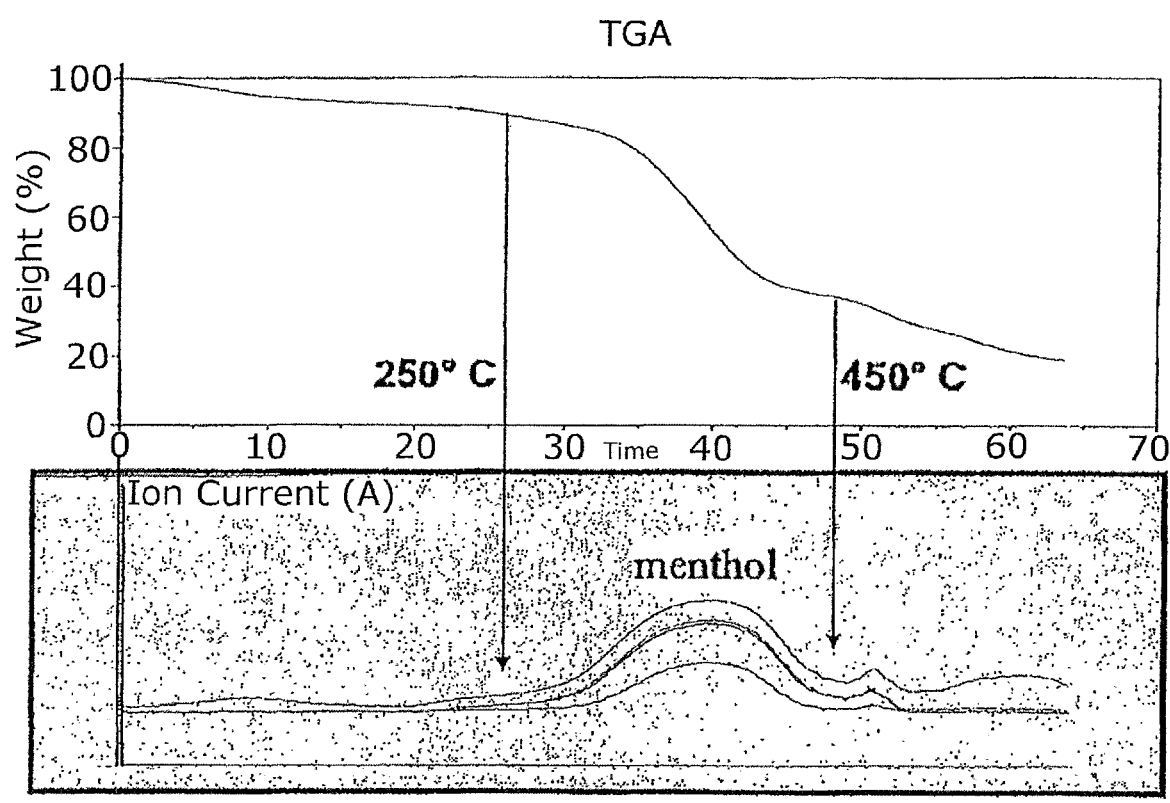
FIG. 3 is a TGA/MS pyrolysis graph of poly(menthyl acrylate).

A poly(methyl acrylate) with Mw of 40,000 g/mol was functionalized by transesterification to obtain poly(menthyl acrylate). The functionalized polymer was characterized by NMR. The menthol release was observed by GC/MS pyrolysis as well as TGA/MS analysis. GC/MS pyrolysis showed the menthol release from the functionalized polymer at 300° C. (FIG. 2). TGA/MS analysis of the polymer showed the release of menthol by pyrolysis at temperatures between 250° C.-450° C. (FIG. 3).

Example 4

Transesterification of Poly(Methyl Methacrylate) with Sodium Mentholate

A round bottomed flask equipped with a rubber septum and a magnetic stirring bar was charged with poly(methyl methacrylate) (2.85 g) dissolved in toluene (68.65 mL). Sodium mentholate in heptane (44% by weight, 17 mL) was added to the round bottomed flask and the mixture was magnetically stirred at ambient temperature for 24 hours. The reaction mixture was then washed with water several times and dried over anhydrous sodium sulfate. The solvent was removed by rotary evaporation to give a dry polymer (87% yield). The product was characterized by proton NMR and determined to be poly(menthyl methacrylate). GC/MS and TGA showed the release of menthol upon heating the product.

Example 5

Formation of Poly(Menthyl Acrylate-Co-Sodium Acrylate) from Poly(Menthyl Acrylate-Co-Acrylic Acid)

Poly(menthyl acrylate-co-acrylic acid) (1 g) was dissolved in 25 ml of acetone. Sodium hydroxide solution (3 g NaOH in 15 ml de-ionized $H_2O$) was added to the polymer solution at ambient temperature under vigorous stirring. After 2 hours, the mixture was filtered and the solid product was washed twice with 20 ml of 50% ethanol in water by volume, then with 20 ml of ethanol. Product was dried in vacuum line at 50° C. GC/MS analysis showed the release of menthol upon heating the product to 300° C.

Example 6

Formation of Poly(Menthyl Acrylate-Co-Sodium Acrylate) from Poly(Menthyl Acrylate-Co-Acrylic Acid)

Poly(menthyl acrylate-co-acrylic acid) (20 g) was dissolved in 600 ml of acetone. Sodium hydroxide solution (60 g NaOH in 300 ml DI $H_2O$) was added dropwise to the polymer solution at 0-5° C. After 2 hours, the mixture was filtered and the solid product was washed twice with 300 ml of 33% ethanol in water by volume, then with 200 ml of ethanol. Product was dried in vacuum at 50° C.

A portion of the above prepared polymer sample (10 g) was dissolved in 300 ml of DI water at 90° C. The solution was then cooled down to 50° C. Sodium hydroxide solution (30 g NaOH in 150 ml DI water) was added quickly to the aqueous polymer solution under vigorous stirring. A milk-like emulsion formed immediately. The mixture was allowed to stir at 50° C. for 2 hours and then precipitated in 800 ml of acetone. The solid product was filtered and washed twice with a mixture of water and acetone (100 ml+100 ml), then with acetone (100 ml). The white solid was dried in vacuum at 50° C. GC/MS analysis showed the release of menthol upon heating the product to 300° C.

Example 7

Emulsion Copolymerization of Menthyl Acrylate (MnA) and Sodium Acrylate by Free Radical Polymerization A round bottomed flask was charged with sodium acrylate (1.85 g), DI water (40 ml), sodium dodecyl sulfate (0.01 g), menthyl acrylate (3.44 g) and hexadecane (0.166 g). The mixture was stirred using a homogenizer for 3 minutes until a stable emulsion was formed. Potassium persulfate ($K_2S_2O_8$) (0.10 g) was added to the flask. The mixture was then bubbled with nitrogen for 0.5 hour. The sealed flask was put into an oil bath preset to 70° C. After 3 hours, the contents of the flask were poured into 250 ml ethanol, and the solid product was dried in vacuum to obtain a polymer (3.19 g). It was determined that 60.1% of the flavor monomer was converted to the polymer.

Example 8

Atom Transfer Radical Polymerization (ATRP) of Menthyl Acrylate

A 20 ml glass vial was charged with anisole (5 ml), tris[2-(dimethylamino)ethyl]amine ($Me_6TREN$) (0.055 g, 0.239 mmol), menthyl acrylate (4.980 g, 23.7 mmol), and ethyl 2-bromopropionate (2-EBP) (0.043 g, 0.237 mmol). The contents of the vial were transferred to a 100 ml nitrogen filled Schlenk flask containing CuBr (0.034 g, 0.237 mmol). The flask underwent three freeze-pump-thaw cycles to degas the mixture. The flask was charged with $N_2$ at room temperature, then placed in an oil bath at 95° C. After 7.5 minutes, 44.2% of the menthyl acrylate was converted to poly(menthyl acrylate) with $M_n$ of 7500 and $M_w/M_n$ of 1.07.

Example 9

ATRP of Menthyl Acrylate by 2-EBP/CuBr+$CuBr_2$/ $Me_4$Cyclam System

A 20 ml glass vial was charged with ethanol (10 ml), menthyl acrylate (1.262 g, 6.00 mmol), 2-EBP (0.011 g, 0.06 mmol), and 1,4,8,11-tetramethyl-tetraazacyclotetradecane ($Me_4$Cyclam) (approximately 0.015 g, 0.06 mmol). The contents of the vial were transferred to a 100 ml nitrogen filled Schlenk flask containing CuBr (0.009 g, 0.062 mmol) and $CuBr_2$ (0.007 g, 0.031 mmol). The flask underwent three freeze-pump-thaw cycles to degas the mixture. The flask was charged with $N_2$ at room temperature, then placed in an oil bath at 80° C. After 4 hours, 63.7% of the menthyl acrylate was converted to poly(menthyl acrylate) with $M_n$ of 10300 and $M_w/M_n$ of 1.34.

Example 10

Flavor Release from Poly(Menthyl Acrylate-Co-Sodium Acrylate) by Hydrolysis

A sample of poly(menthyl acrylate-co-sodium acrylate) was placed in a container of water at about 70° C. It was detected that menthol was released from the polymer into the water.

While various embodiments have been described with reference to specific embodiments, variations and modifications may be made without departing from the spirit and the scope of the appended claims. Such variations and modifications are to be considered within the purview and scope of the appended claims.

All of the above-mentioned references are herein incorporated by reference in their entirety to the same extent as if each individual reference was specifically and individually indicated to be incorporated herein by reference in its entirety.

We claim:

1. An electrical smoking system comprising:
an electrical heater;
a smokable material; and
a copolymer, the copolymer comprising a flavorant-containing repeating unit including a flavorant and a salt-containing repeating unit, or a polymer comprising a flavorant-containing repeating unit including a flavorant, wherein the flavorant is linked to a polymeric backbone through a non-carbonate linking group, which is capable of releasing the flavorant when heated.

2. The electrical smoking system of claim 1, comprising a rod of tobacco or a tobacco substitute.

3. The electrical smoking system of claim 1, wherein the flavorant-containing repeating unit comprises a flavorant-containing (meth)acrylate or itaconate repeating unit.

4. The electrical smoking system of claim 1, wherein the flavorant comprises a compound comprising at least one hydroxyl, carboxyl, aldehyde or ketone group.

5. The electrical smoking system of claim 4, wherein the compound is selected from the group consisting of menthol, vanillin, linalool, guaicol, thymol, coumarin, eugenol, cinnamaldehyde, geraniol and carvone.

6. The electrical smoking system of claim 1, wherein the flavorant comprises menthol.

7. The electrical smoking system of claim 1, wherein the salt comprises a metal selected from the group consisting of sodium, potassium, magnesium, and calcium.

8. The electrical smoking system claim 1, wherein the flavorant-containing repeating unit is added to the smokable material.

9. The electrical smoking system of claim 1, wherein the flavorant-containing repeating unit is a flavorant-containing (meth)acrylate repeating unit.

10. The electrical smoking system of claim 1, wherein the flavorant is linked to the polymeric backbone through an ester, ether, hemiacetal, hemiketal, acetal or ketal linking group.

11. The electrical smoking system of claim 1, wherein the polymeric backbone comprises polyester, polyamide, polyurethane, polyethylene, polypropylene, poly(meth)acrylates or polyacrylonitrile.

12. The electrical smoking system of claim 1, wherein the salt includes sodium, potassium, magnesium, or calcium.

13. An electrical smoking system comprising:
an electrical heater;
a smokable material; and
a copolymer, the copolymer comprising a flavorant-containing repeating unit including a flavorant and a salt-containing repeating unit, or a polymer comprising a flavorant-containing repeating unit including a flavorant, wherein the flavorant is linked to a polymeric backbone through an ester, ether, hemiacetal, hemiketal, acetal or ketal linking group,
wherein the copolymer is capable of releasing the flavorant when heated;
wherein the flavorant is selected from the group consisting of menthol, vanillin, linalool, guaicol, thymol, coumarin, eugenol, cinnamaldehyde, geraniol and carvone;
wherein the polymeric backbone comprises polyester, polyamide, polyurethane, polyethylene, polypropylene, poly(meth)acrylates or polyacrylonitrile; and wherein the salt includes sodium, potassium, magnesium, or calcium.

\* \* \* \* \*